United States Patent [19]

Chiurlo et al.

[11] Patent Number: 5,948,535
[45] Date of Patent: Sep. 7, 1999

[54] METHOD FOR PREPARING OPTICAL COMPONENTS AND DEVICES IN THEIR FINAL OR NEARLY FINAL DIMENSIONS, AND PRODUCTS OBTAINED THEREBY

[75] Inventors: Paolo Chiurlo, Milan; Guido Cogliati, Rome; Lorenzo Costa, Sommo, all of Italy

[73] Assignee: Enichem S.p.A., Milan, Italy

[21] Appl. No.: 08/517,461

[22] Filed: Aug. 21, 1995

Related U.S. Application Data

[63] Continuation of application No. 08/114,435, Aug. 30, 1993, abandoned.

[30] Foreign Application Priority Data

Sep. 1, 1992 [IT] Italy ................................. MI92A2038

[51] Int. Cl.$^6$ ........................................................ B32B 17/00
[52] U.S. Cl. ...................... 428/426; 428/688; 428/542.8; 428/446; 501/902; 501/903; 501/905
[58] Field of Search .............................. 501/12, 902, 903, 501/905; 428/688, 542.8, 426, 446

[56] References Cited

U.S. PATENT DOCUMENTS

| | | | |
|---|---|---|---|
| 4,680,049 | 7/1987 | Onorato | 65/18.1 |
| 4,786,618 | 11/1988 | Shoup | 501/12 |
| 4,789,389 | 12/1988 | Schermerhorm | 501/12 |
| 4,883,521 | 11/1989 | Shimizu | 501/12 |
| 4,943,542 | 7/1990 | Hayashi | 501/12 |
| 5,160,358 | 11/1992 | Kondo | 501/12 |
| 5,196,382 | 3/1993 | Hench | 501/12 |
| 5,207,814 | 5/1993 | Cogliati | 501/12 |
| 5,240,488 | 8/1993 | Chandross | 501/12 |
| 5,304,364 | 4/1994 | Costa | 501/12 |
| 5,328,645 | 7/1994 | Lin | 501/12 |

FOREIGN PATENT DOCUMENTS

| | | |
|---|---|---|
| 0382310 | 8/1990 | European Pat. Off. . |
| 0383378 | 8/1990 | European Pat. Off. . |
| 1148726 | 6/1989 | Japan . |
| 2165234 | 4/1986 | United Kingdom . |
| 9312045 | 6/1993 | WIPO . |

OTHER PUBLICATIONS

Patent Abstracts of Japan, vol. 11, No. 398 (c–466) 1987, JP 62158126 abstract.
Patent Abstracts of Japan, vol. 13, No. 408 (c–634) 1989, JP 01148726 abstract.

*Primary Examiner*—Timothy M. Speer
*Attorney, Agent, or Firm*—Kramer, Levin, Naftalis & Frankel

[57] ABSTRACT

The preparation of objects, in particular optical components and/or devices, is described using, as precursors of optical materials, amorphous monolithic aerogels for high-precision mechanical machining.

2 Claims, No Drawings

METHOD FOR PREPARING OPTICAL COMPONENTS AND DEVICES IN THEIR FINAL OR NEARLY FINAL DIMENSIONS, AND PRODUCTS OBTAINED THEREBY

This application is a continuation of Ser. No. 08/114,435 filed Aug. 30, 1993, now abandoned.

This invention relates to a method for preparing optical components and devices consisting of initially preparing an intermediate and then miniaturizing it until an element of final or nearly final dimensions is obtained.

More particularly, the present invention relates to the preparation of said objects by a method in which the final miniaturization stage is reached with amorphous monolithic aerogels consisting mainly of silicon oxides, or silicon oxide in the presence of one or more other oxides of elements pertaining to Groups 1–4 of the Periodic Table of Elements.

Because of their hardness and fragility optical materials, and in particular transparent optical materials such as fused silica or quartz and optical glasses, are typical materials of known machining difficulty, direct hot moulding of optical components and devices not being generally acceptable for reasons of product quality.

The conventional method for producing these optical elements is based on reducing a suitable preform to the final product by slow and precise grinding operations.

Although some of these operations such as reduction to a flat or spherical surface can be automated, others such as aspheric finishes require complicated manual procedures.

This machining difficulty results in poor process flexibility at the industrial level and in disproportionately high costs for quality optical components, such as optical components and devices based on aspheric optics.

The optical industry has sought to remedy these technological limitations in various ways.

One of these is the high pressure and high temperature pressing of aspheric lenses and other optical components directly from suitable preforms of the desired optical material; with this method, which uses extremely sophisticated equipment such as a hot isostatic press, the products obtained are of high quality but also of high cost, this being a process which requires considerable investment.

One method for reducing costs could be the use of organic optical materials, in particular plastics.

These materials can be melted and moulded using very economical processes and can also be very easily machined with machine tools. Unfortunately the dimensional precision of optical products generally obtained by fusion is negatively influenced by insufficiently controllable material shrinkage during cooling and phase change, with consequent reduction in optical quality. Optical products obtained from plastics materials by mechanical machining with machine tools are also not of acceptable quality, because the material is too soft for very accurate machining.

Moreover the products obtained by these two processes are negatively influenced both by the chemical stability of these materials and by the dimensional stability of the objects formed from them, and which in neither case achieves the standards required of inorganic optical materials in the optical industry. A further attempt at advancing the technology of machining optical materials was made by developing very high precision machine tools with numerical control provided with a diamond tip for machining hard materials such as quartz and optical glasses and moving on air bearings to minimize the vibration of the tool tip relative to the material.

These machines have been successfully developed during the last ten years and attain profile control precision of the order of one tenth of a $\mu$m or better, and of at least one hundredth of a $\mu$m in controlling surface roughness, and are hence able to finish a piece with so-called "optical" precision.

Unfortunately this high-precision machining, which has proved economically convenient in optical applications such as finishing copper and aluminium mirrors by laser, is not generally economical with transparent optical materials such as silica and inorganic glasses for various reasons including the hardness and fragility of said materials.

It is also known to obtain optical components of defined dimensions by suitably treating a gel obtained as the product of the hydrolysis of a silicon alkoxide. For example, U.S. Pat. No. 4,680,049 describes a method for preparing silicate-based optical glasses comprising initial hydrolysis of silicon, formation of a gel as the product of this hydrolysis, drying the gel and final thermal sintering to obtain an optical glass of defined dimensions. However although dimensionally defined, these final optical products are not isotropic in terms of physical-chemical characteristics, having a deviation of about $12\mu$ in the particular dimension concerned, within three millimetres of surface. The present applicant has now found it possible to prepare perfectly and completely isotropic optical components and devices in their final or nearly final dimensions by applying thermochemical densification treatment to an amorphous monolithic aerogel of silica and/or other oxides able to shrink isotropically and machinable with very high precision by machine tools, in particular with those high-precision numerically controlled machines provided with a diamond tip and moving on an air bearing. The product obtained in this manner has nearly final dimensions, ie requires only optical polishing by conventional methods or, in the limit, has actual final dimensions, ie does not require any further conventional optical working.

The result of the present invention is therefore, in the final analysis, the economical manufacture of optical components and devices of silica or optical glasses using a numerically controlled machine tool.

Consequently the present invention firstly provides an optical article, component or device in final or nearly final dimensions, consisting of silicon oxide, either alone or in the presence of at least a second oxide of elements pertaining to Groups 1–4 of the Periodic Table of Elements, characterised by complete isotropy with respect to all physico-chemical characteristics.

The present invention secondly provides a method for preparing the said optical articles comprising the following steps:

a) mixing a silicon alkoxide, or a silicon alkoxide plus at least one alkoxide of a second element, with water in the presence of an acid catalyst;

b) possibly treating the mixture with ultrasound;

c) hydrolyzing the obtained mixture;

d) possibly removing the alcohol released by the hydrolysis;

e) adding to the hydrolyzate a colloidal suspension of silica or colloidal silica directly;

f) possibly treating with ultrasound;

g) gelling the colloidal solution;

h) washing the gel;

i) drying the gel at a temperature and pressure exceeding the critical temperature and pressure of the wash solvent;

l) heat treating the dried gel to 800° C.;

m) possibly reacting the product obtained in this manner with agents able to substitute the hydroxyls present;

n) oxidizing the resultant product;

o) heating in a noble gas atmosphere to a temperature generally exceeding 1200° C., and defined as the temperature necessary and sufficient to densify the particular aerogel chemical composition. Many of the steps from a) to i) correspond to the steps of the method of Italian patent application No. 19,404 A/89 relative to a method for preparing metal oxide aerogel monoliths, and reference should be made to this application for further information.

In step a), in addition to the silicon alkoxide (preferably tetraethylorthosilicate-TEOS) one or more alkoxides of the elements pertaining to Groups 1–4 of the Periodic Table of Elements can be used, preferably those pertaining to Group 3 and 4, in particular germanium and titanium, or the respective chlorides as replacement for the alkoxides.

For the hydrolysis of step c) to occur an acid catalyst must be present, any known catalyst of this type being usable. According to a preferred embodiment the use of hydrochloric, nitric, acetic, malonic or tartaric acid is preferred.

The hydrolysis is effected at ambient temperature and, on termination, the hydrolyzate solution can be freed of the alcohol which forms during the hydrolysis, after which colloidal silica is added.

After a second possible treatment with ultrasound, the colloidal solution can be fed to the subsequent gelling step in the same concentration as that obtained during the previous mixing of the hydrolyzate with the colloidal oxide suspension. The concentration can hence be high, and no difficulty is observed in conducting the subsequent steps of the method according to the invention.

The colloidal solution is gelled by pouring it into a container of the desired shape and size. The operation is conducted at a temperature of less than 50° C. for a time variable from a few minutes to some hours.

The gel obtained in this manner is washed with an organic solvent suitable for eliminating the hydroalcoholic solution contained in the pores of the gel, it being preferable to use a non-flammable solvent of low critical temperature and pressure.

The gel is finally dried at a temperature and pressure higher than said critical values of the wash solvent.

After heat treatment to 800° C., the product in the form of aerogel can be reacted with agents to remove the hydroxyls and to introduce easily oxidizable substituents. For this purpose chlorinated reagents are preferably used such as carbon tetrachloride or chlorine diluted in inert gas.

The resultant oxide is heated in a noble gas atmosphere to a temperature which in the case of silica is higher than 1200° C., for the time required to achieve the required dimension (maximum 2 hours).

The aforegoing and further operational details will be more apparent from the following examples, which are given as non-limiting illustration of the invention.

EXAMPLE 1

80 ml of 0.01N HCl are added under rigorous agitation to 100 ml of tetrathylorbosilicate. (TEOS) (0.44 mol) (molar ratio TEOS:$H_2O$:HCl=1:10:1.8×10$^{-4}$). After about 60 minutes a clear solution is obtained. 52.8 g of powdered collidal silica, obtained for example from silicon tetrachloride by high temperature oxidation, are added to this solution under vigorous agitation. The commercial product known as Aerosil 0×50 and marketed by the Degussa Company, is particularly suitable for the said application. The mixture obtained is homogenized using ultrasound for about ten minutes and is then clarified by centrifuging.

The homogeneous dispersion obtained is poured into polyester containers of the required dimensions and shape, which are then sealed hermetically and maintained at 50° C. for 12 hours. The aerogel prepared in this manner has a mechanical strength insufficient for the mechanical machining necessary to give it the desired shape.

It must therefore be subjected to heat treatment to cause partial sintering of the material. Laboratory tests have shown that sintering to an apparent density of about 50% of the theoretical density of amorphous silica results in a material easily worked by machine tools.

The aerogel is therefore heated in air to 1000° C. for one hour. During this heating the residual organic products from the pressure vessel treatment are burnt off.

After mechanical machining the partly sintered silica aerogel piece is subjected to further heat treatment to achieve complete sintering of the silica. The heating is conducted in a helium atmosphere to a temperature of 1400° C. The piece is maintained at this temperature for one hour.

After cooling, the piece has the desired final dimensions while maintaining the shape given it by the mechanical machining of the partly sintered aerogel.

The sintered material has the same physico-chemical characteristics as amorphous silica obtained by fusion.

EXAMPLE 2

80 ml of 0.01N HCl are added under rigorous agitation to 100 ml of tetraethyforthosilicate (TEOS) (0.44 ml) (molar ratio TEOS $H_2O$:HCl 1:10:1.8×10$^{-4}$). After about 60 minutes a clear solution is obtained. 52.8 g of powdered colloidal silica, for example the commercial product known as Aerosil 0×50 of the Degussa Company, are added to this solution under vigorous agitation.

A 0.1N ammonium hydroxide solution is added dropwise under agitation to the homogeneous solution obtained until a pH of 4–5 is reached, after which the colloidal solution is poured into polyester containers of the required dimensions and shape, which are then sealed hermetically and maintained at 50° C. for 12 hours. The preparation of the gel, its drying, partial sintering, mechanical machining and final sintering are effected in accordance with the procedure described in Example 1.

EXAMPLE 3

Three cylindrical aerogel ingots of 45 mm base diameter and 30 mm height, originating from batch A 34/2 of eight identical samples prepared by the process described in Example 2 were machined on a numerically controlled high precision lathe provided with diamond tipped tools and with "vibrationless" movement on compressed air bearings on the premises of the firm CONTEK of Varallo Sesia. The three samples identified respectively by the codes $\bar{I}\alpha$-62, $\bar{I}\alpha$-64, $\bar{I}\alpha$-65 were identically shaped with an aspheric surface corresponding to the equation $$X = \frac{CY^2}{1 + \sqrt{1 - (K+1)C^2Y^2}} + DY^4 + EY^6 + FY^8 + GY^{10}$$

with its axis parallel to the axis of the cylinder.

The three samples were then aligned at the centre of a MITUTOYO SERIES 332 profile projector and compared with the theoretical profile corresponding to the equation.

The comparison was made by direct superimposing on the screen. To increase the sensitivity of the method to the required level, each analysis was conducted with the aid of a photograph subsequently projected on a giant screen, achieving sensitivity to one tenthousandth of the dimensions of the object.

The aerogels or intermediate products were then miniaturized by the heat treatment described in the following example and compared with the respective theoretical profile as in the case of the aerogels.

Both in the case of the precursors and in the case of the densified products the maximum deviation from the respective theoretical profiles was less than 0.0002 mm, this being the sensitivity limit of the method.

The results are summarized in the following table.

| MAXIMUM DEVIATION FROM THEORETICAL VALUE | | |
|---|---|---|
| | Precursor deviation | Product deviation |
| $\bar{I}\alpha$-62 | $<2 \times 10^{-4}$ | $<2 \times 10^{-4}$ |
| $\bar{I}\alpha$-64 | $<2 \times 10^{-4}$ | $<2 \times 10^{-4}$ |
| $\bar{I}\alpha$-65 | $<2 \times 10^{-4}$ | $<2 \times 10^{-4}$ |

We claim:

1. An optical article in final or nearly final dimensions, consisting essentially of silicon oxide, or of silicon oxide and at least a second oxide of an element in Group 4 of the Periodic Table of Elements, characterized by complete isotropy with respect to all physico-chemical characteristics, the article showing the following properties:

UV transmittance T(lambda)/mm higher than 80% at lambda=200 nm;

Refractive Index (nd): equal to or less than 1.46;

Yield Temperature (At): greater than 1300° C.;

Abbe Number (nud): greater than 60; and

Specific Gravity: less than 2.3 g/cm$^3$.

2. An optical article in accordance with claim 1, consisting of silicon oxide and a second oxide, wherein this latter is chosen from germanium and titanium oxides.

* * * * *